SELF-CORRECTING EXAMINATION SHEET

Filed Sept. 9, 1964

INVENTORS
THOMAS P. TAYLOR
LAURENCE H. SNIVELY
BY
Browne Schuyler and Beveridge
ATTORNEYS 3,283,416
SELF-CORRECTING EXAMINATION SHEET Thomas P. Taylor, R.D., Knoxville, Pa., and Laurence H. Snively, Mansfield, Pa.

Filed Sept. 9, 1964, Ser. No. 395,123
2 Claims. (Cl. 35—9)

This invention relates to a self-correcting examination sheet and more particularly to a self-correcting examination device wherein the components thereof are integrally related.

In general, this invention relates to a self-correcting examination device for objective type question requiring so-called true-false, multiple type, etc. Self-correcting examination devices of the type here under consideration have been known heretofore but these have been comparatively expensive devices and structures which, in general, are designed for use over and over again.

The objects of this invention are to provide a relatively inexpensive and easy to use self-correcting examination device; to provide an improved self-correcting examination device; a one use self-correcting examination device; and to provide a self-correcting examination device that may be incorporated in a book.

Briefly, the invention features an answer selection overlay sheet which is adhesively laminated to a perforated or scored answer underlay sheet. The overlay has a plurality of answer selection areas designated thereon and the underlay sheet, which may be of heavier stock, includes a plurality of hinged answer tabs equal in number to the number of answer selection areas and in registration with the answer selection areas on the overlay sheet. The answer tabs normally are integrally connected to the underlay sheet by rupturable connectors and a hinge connector. The answer areas of the sheets have no adhesive between them so that in use a punch device can perforate the answer selection area on the overlay sheet to push out the rupturable hinged tab on the underlay sheet. Each hinged answer tab has printed thereon indicia which advises the user whether he has given a correct or incorrect answer. Preferably, this is by way of color indicia, correct answers being of one color and incorrect answers being of another color. Since the answer tabs are hinged to the underlay sheet, the indicia thereon is viewable directly through the punched out answer selection area by the user of the device and in this way advise the user whether the given answer is correct or incorrect.

Other objects, advantages and features of the invention will become apparent from the following specification when considered with the accompanying drawing wherein.

Figure 1:
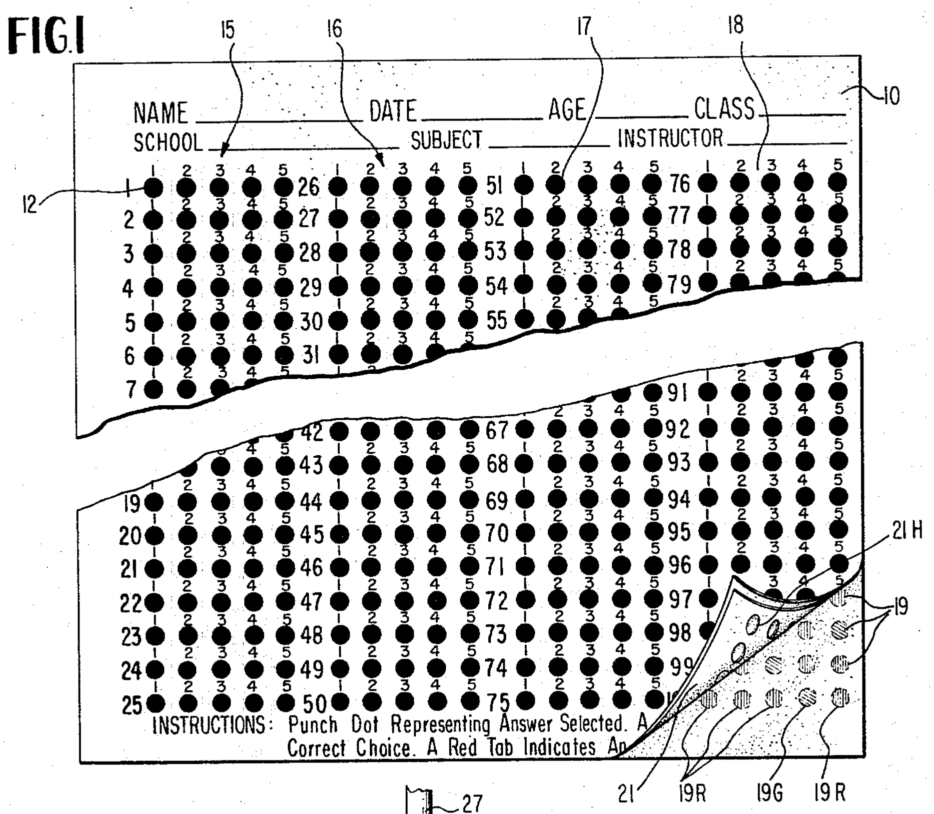
FIG. 1 is a plan view of a self-correcting examination sheet in accordance with the invention wherein one corner thereof is peeled back to better disclose the invention.

As shown in the drawings, the invention comprises, generally, an answer selection sheet 10, an answer code sheet 11 adhesively secured to the undersurface of answer selection sheet 10. As shown, answer selection sheet 10 has a plurality of answer selection areas 12, there being a choice of five possible answers for each question. These answer selection areas are designated by the circular black areas and there are four columns 15, 16, 17 and 18, each column containing twenty-five rows of answer selection areas to accommodate 100 questions. Obviously, more or less columns may be provided, as well as more or less answer selection areas as desired. For example, true or false type questions would require only two answer selection areas per row. In addition, answer selection areas 12 may be printed circles, ovals, squares, or the like.

Answer selection sheet 10 is made of easily rupturable material, preferably paper, and the printed matter thereon including the answer selection areas 12 printed thereon by conventional printing techniques.

Preferably, however, if the answer selection sheet 10 is of relatively thin paper, the answer selection areas 12 are printed with black ink so as to render answer selection areas 12 opaque. If answer selection sheet 10 is of opaque material, such as being heavier opaque paper, it may be printed in any other color ink and any combination of paper and ink can be used, the only requirement being that at least in the answer selection areas 12 on answer selection sheet 10 are opaque.

Answer code sheet 11 is, preferably, of heavier stock material than answer selection sheet 10 and is preferably of paper stock. Answer code sheet 11 has arrayed thereon a plurality of answer tabs 19 corresponding in number and position to the number of answer selection areas 12 on answer selection sheet 10. As shown in the drawings, answer tabs 19 have colored indicia thereon with a specific color being assigned to indicate a correct answer and the remaining answer areas 19 being in a given row having a different color indicia thereon to indicate an incorrect answer. For example, answer areas 19 for question "100" have therebeneath four red tabs 19R which indicate incorrect answers and one green tab 19G indicating a correct answer.

Answer sheet 11 is adhesively secured or laminated to answer selection sheet 10 by conventional laminating technique. This adhesive may be applied after the printing of the color indicia of tabs 19 in answer sheet 11. Alternatively, the answer sheet 11, after the formation of rupturable tabs 19 therein, may be coated with an adhesive layer and a suitable ink utilized to print the indicia on the adhesive layer.

The particular method utilized in making the self-correcting examination answer sheet shown herein however comprises the utilization of a thermosetting tissue sheet 21 having holes 21H corresponding to rupturable answer selection areas 12 and rupturable tabs 19 and in registration therewith. Tissue sheet 21 is placed between answer selection sheet 11 and answer sheet 12 and heat and pressure then applied to cause the answer selection sheet 10 to be adhered to answer sheet 11.

Figures 2, 2A, 3, 4:
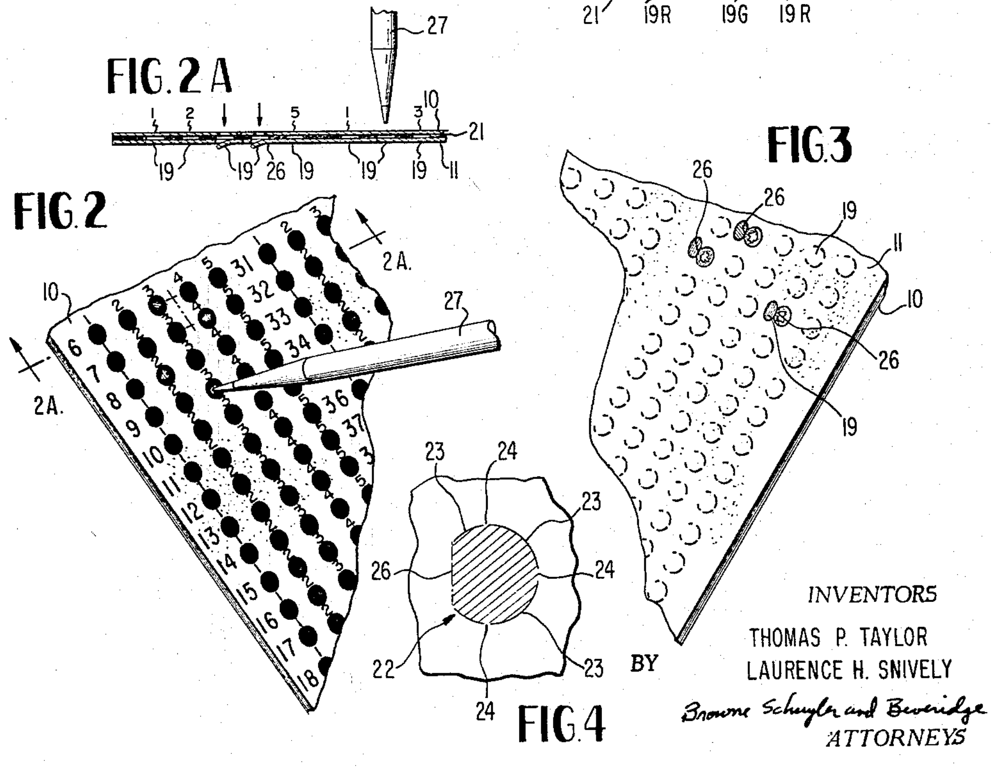
FIG. 2 is an isometric view of a self-correcting examination sheet in use in accordance with the invention.
FIG. 2A is a cross-sectional view (enlarged in the thickness direction) taken on the lines 2A—2A of FIG. 2.
FIG. 3 is a bottom view of the self-correcting examination sheet shown in FIG. 2.
FIG. 4 is an enlarged view of a portion of an answer sheet with the answer selection sheet removed.

All of the tabs 19 in answer sheet 11 are formed by perforating the answer sheet 11. Thus, lines 22 (FIG. 4) are score lines in which arcuate slits 23 are separated by small rupturable segments 24 and hinge element 26. As shown in the drawings, the hinge element 26 is at the left-hand side of the tabs but it will be appreciated that, if tabs 19 are circular, the hinge may be at any chord of an arc between the hinge and ends of the slits 23. If tabs 19 are rectangular or polygonal, then one side of the rectangle or polygon would be the hinge, the remaining sides being slit and the corners remaining connected to the answer sheet by rupturable segments Thus, while tabs 19 on answer sheet 11 are easily punched out, they are hingedly attached to answer sheet 11 by hinges 26, as is shown in FIGS. 2A and 3. Moreover, after segments 24 have been ruptured they serve to frictionally retain tabs 19 generally in the plane of answer sheet 11.

The invention is preferably used with a punch device 27 which may be a pencil or other punch instrument. The action of punch 27 is to puncture and spread back enough of the answer selection sheet 10 such that a tab 19 below the selected answer area can be easily seen by the user of the device and simultaneously rupture segments 24 holding tabs 19 in position. The user can then determine whether he has given a correct or incorrect answer by the color of the tab 19 viewable through the spread back portion of answer selector sheet 10. Thus, if the answer selection area punched by a student has therebeneath a green tab 19G, the student is apprized of the fact that he has given a correct answer. However, should the answer selection area 12 selected by the student have therebeneath a red colored tab 19R, then the student is apprized of the fact that he has given an incorrect answer. If more than one answer selection area 12 has been punched by the user of the device, and it is desired to grade the answer selection sheet answer device by an instructor, then the fact that an incorrect answer was given will be indelibly recorded on the answer correction sheet. If the student had to give still a further answer and this answer was also incorrect, this will also be recorded on the answer sheet. This is true until the student gives the correct answer, in which case no further punching will be required.

It will be understood that a key sheet (not shown) may be constructed by punching out areas on a said key sheet which correspond with tabs 19 on answer sheet 11, which key sheet may be used as a guide in making questions for the answer sheet and also as an aid in correcting the answer sheets. Therefore, the self-correcting examination sheet of the invention may be made up in large numbers and the questions prepared to fit the answer sheet, or, vice versa, the answer sheet may be made up to fit a given examination. In addition, the educational device of the present invention is applicable to teacher-made tests, standardized tests, workbook reviews, quizzes and programmed learning.

It will be apparent that the self-correcting answer sheet may be incorporated in a book or the like since the two laminas making up the answer sheet are relatively thin.

As shown in FIG. 1, the left side of sheets 10 and 11 have been left blank so that the device may be incorporated in a student's workbook, if desired. It will be appreciated that this may be merely an extension of only one of the sheets 10 or 11. Moreover, one or both of the sheets 10 and 11 may be integral with another page of the book and thus serve as a second sheet in a further self-correcting examination sheet similar to the one disclosed herein. For example, our self-correcting examination answer sheets can be inserted at the ends of chapters or sections of a student's workbook. Pairs of self-correcting examination sheets may have one or both lamina 10 and 11 integral with one another with each device provided with answers corresponding to questions pertaining to the subject matter of the workbook chapter or section preceding them. Of course, it is not necessary that the examination devices follow the chapters or sections or that they be bound in the workbook.

Moreover, if the self-correcting examination sheet is bound in a book, a score line may be provided along the bound edge of the sheet for easy detachment of same from the book. As noted earlier herein, segments 24 serve to frictionally retain tabs 19 generally in the plane of answer sheet 11 so that a book incorporating the invention will not be thickened by the thickness of tabs 19, in addition to retaining tabs 19 in position for viewing through the punctures in answer selection areas 12.

In view of the above, the essence of the present invention involves an inexpensive, nonreuseable, self-correcting examination sheet comprising a pair of thin lamina adhesively laminated together and in which rupturable tabs are hingably secured to one of the lamina and which are viewable through a punched out area in the other lamina to convey information to the user of the device.

It is to be understood that certain changes and modifications in the structure as illustrated and described may be made without departing from the spirit or the scope of the invention as defined in the following claims.

What is claimed is:

1. A self-correcting examination device comprising in combination,
   a relatively thin paper answer selection sheet member,
   opaque answer selection areas on said answer selection sheet, said opaque answer selection areas being arrayed in vertical columns and horizontal rows,
   an answer code sheet member having arrayed thereon a plurality of answer tab areas corresponding in number and position to the number and position of the answer selection areas on said answer selection sheet and normally non-visible instructional indicia at said answer areas,
   said answer code sheet being of heavier stock material than said answer selection sheet,
   means adhesively laminating said thin answer selection sheet to the surface of said answer code sheet with the answer tab areas on said answer code sheet behind and in registry with the opaque answer selection areas on said answer selection sheet,
   said answer tab areas on said answer code sheet being defined by a plurality of slits separated by at least one rupturable segment and by at least one non-rupturable segment,
      said segments being integral with said answer code sheet,
      said non-rupturable segment forming a hinge for said answer selection area of said second sheet,
   whereby said answer tab areas on said answer code sheet swing on an arc about said hinges during the rupturing of the answer selection areas overlying same when a punch device punctures the answer selection area overlying same and the indicia at the answer tab area underlying the punctured answer selection area is viewable through the punctured answer selection area to a user of the device on removal of said punch device,
   and said rupturable segments after rupturing are capable of frictionally retaining said answer tab area in the plane of said answer code sheet.

2. A self-correcting examination device as defined in claim 1 wherein said means adhesively laminating said answer selection sheet and said answer code sheet together, comprises a heat and pressure sensitive lamina having apertures therein arrayed in a manner correspondingly identical to the manner in which said answer areas are arrayed on said answer selection areas.

References Cited by the Examiner

UNITED STATES PATENTS

| | | | |
|---|---|---|---|
| 1,860,909 | 5/1932 | Taylor | 35—48 |
| 1,984,726 | 12/1934 | Brownlee | 35—48 |
| 2,006,620 | 7/1935 | Barrett et al. | 273—139 |
| 2,315,737 | 4/1943 | Ross | 273—139 |
| 2,540,363 | 2/1951 | Wistar | 35—48 |
| 2,551,083 | 5/1951 | Angell et al. | 35—48 |
| 2,618,866 | 11/1952 | Adams | 35—48 |
| 2,812,957 | 11/1957 | Sarlund | 283—6 |
| 3,040,472 | 6/1962 | Miller | 283—6 X |
| 3,151,403 | 10/1964 | Sinex | 35—48 X |

EUGENE R. CAPOZIO, *Primary Examiner.*

JEROME SCHNALL, *Examiner.*

S. M. BENDER, *Assistant Examiner.*